(12) United States Patent
Potter

(10) Patent No.: US 7,133,267 B2
(45) Date of Patent: Nov. 7, 2006

(54) ARC DETECTION CIRCUIT

(75) Inventor: Frederick Jerome Potter, Trumbauersville, PA (US)

(73) Assignee: Ametek, Inc., Paoli, PA (US)

( * ) Notice: Subject to any disclaimer, the term of this patent is extended or adjusted under 35 U.S.C. 154(b) by 49 days.

(21) Appl. No.: 10/986,545

(22) Filed: Nov. 10, 2004

(65) Prior Publication Data

US 2006/0098361 A1    May 11, 2006

(51) Int. Cl.
*H02H 3/00*    (2006.01)

(52) U.S. Cl. ........................................................ 361/42
(58) Field of Classification Search .................. 361/42
See application file for complete search history.

(56) References Cited

U.S. PATENT DOCUMENTS

| 5,224,006 | A |  | 6/1993 | MacKenzie et al. ........... 361/45 |
| 5,479,076 | A | * | 12/1995 | Moberg ....................... 315/307 |
| 5,691,869 | A |  | 11/1997 | Engel et al. .................... 361/42 |
| 6,577,138 | B1 | * | 6/2003 | Zuercher et al. .............. 324/536 |
| 6,798,628 | B1 | * | 9/2004 | Macbeth ....................... 361/42 |
| 2004/0027749 | A1 | * | 2/2004 | Zuecher et al. ................ 361/62 |
| 2006/0050450 | A1 | * | 3/2006 | Pellon et al. .................. 361/42 |

* cited by examiner

*Primary Examiner*—Ronald Leja
(74) *Attorney, Agent, or Firm*—Hayes Soloway P.C.

(57) ABSTRACT

An arc detector comprising a voltage generator for detecting a voltage and an integrator for integrating said voltage with respect to time and generating an output signal corresponding to said integration. The arc detector also includes a discharge controller for controlling said output signal of said integrator, an amplifier for amplifying said output signal from said integrator and outputting an amplified signal; and a comparator for comparing said amplified output signal to a reference voltage and generating a detection signal based on said comparison.

7 Claims, 9 Drawing Sheets

Ch1  200mV          M10.0ms  A Ch1∕  204mV

US 7,133,267 B2

ARC DETECTION CIRCUIT

BACKGROUND OF THE INVENTION

The present invention relates to the field of electrical devices for detecting fault conditions, and more particularly to devices that sense the presence of electrical arcs in a circuit. Electrical arcing is a localized, high-energy event caused by wire chafing, dust build up and moisture that may result in a catastrophic fire. However, arcs, like many transients, are very short lived and therefore cause little impact on bi-metallic elements or the electronics. Consequently, conventional circuit breakers and electronic wire protection methods do not interrupt circuits fast enough to prevent damage or a fire. There are two distinct types of arcs, series arcs and parallel arcs.

In general, a parallel arc starts when current flows between two touching oppositely charged conductors causing metal at the contact point to liquefy and current to jump over the resulting gap. The arc may then dissipate, but has the potential to re-establish itself at a later time. Parallel arcs may also occur intermittently, usually as a result of vibration, without ever turning into a hard short. FIG. 9 shows a typical arc in a 28VDC system where the arcing event occurs over several seconds.

The arc current in a parallel arc does not pass through the load, and only the source current capability and wiring resistance limit the peak arc current. There are several scenarios in which parallel arcs occur. For example, parallel arcs can occur when wire insulation is missing or damaged and a wire connected to an aircraft power bus lightly contacts the airframe ground (or another exposed wire), or when insulation located in a wet or dirty environment is missing or damaged.

The other type of arc is a series arc. A series arc occurs when a gap, or break in the circuit, develops in series with a load that is normally connected to an aircraft power bus and the load current jumps over the gap. Unfortunately, some loads utilize series arcs as part of normal operation, so they cannot be reliably detected. For example, the normal sparking of a motor commutator cannot be distinguished from a series arc. Arc lamps, i.e., strobes and fluorescent lighting are also hard to distinguish from arcs.

Various types of arc detectors have been developed and/or proposed to detect arc currents. Generally, there are two types of detectors. One type responds to the random high frequency noise content of the current waveform generated by an arc. This high frequency noise tends to be attenuated, especially by the presence of filters on some loads, which can be connected to the branch circuit. The other basic type of arc detector responds to the step increase in current occurring as the arc is repetitively and randomly struck. Examples of arc detectors of the latter type are disclosed in U.S. Pat. Nos. 5,224,006 and 5,691,869.

These prior art devices have difficulty distinguishing arc currents from normal inrush currents. Inrush currents, e.g., capacitive inrush currents, lamp inrush currents, or motor inrush currents, are different from arc currents in one very important respect; inrush currents are much more regular and predictable. Exemplary types of inrush currents are described below.

The capacitive inrush current is exponential in shape, shown in FIG. 10, with a time constant determined by circuit resistance and load capacitance, e.g., an electronic device that has a capacitor bank on the input, such as a flight computer, data acquisition box ("black box") or similar piece of avionics equipment. Lamp inrush currents occur when there is a change in resistance from a cold filament to a hot filament in an incandescent lamp. An exemplary waveform for a lamp inrush current is shown in FIG. 11. However, lamp inrush currents vary with lamp type. A motor inrush current occurs when a motor starts.

An effective arc current detector will ignore all of these types of inrush currents and only trip when an actual arc is detected. Therefore, there is a need for an improved arc detection circuit.

SUMMARY OF THE INVENTION

The instant invention relates generally to a circuit and more particularly to an arc detection circuit comprising voltage generator for detecting a voltage, an integrator for integrating said voltage with respect to time, a discharge controller for controlling the output of current from the integrator, an amplifier for amplifying the current output from the integrator, and a comparator for comparing a signal output from the amplifier to a reference voltage an generating a detection signal based on the comparison.

DETAILED DESCRIPTION OF THE EMBODIMENT

An arc detector consistent with the present invention comprises a circuit module connected across a load.

Figure 1:
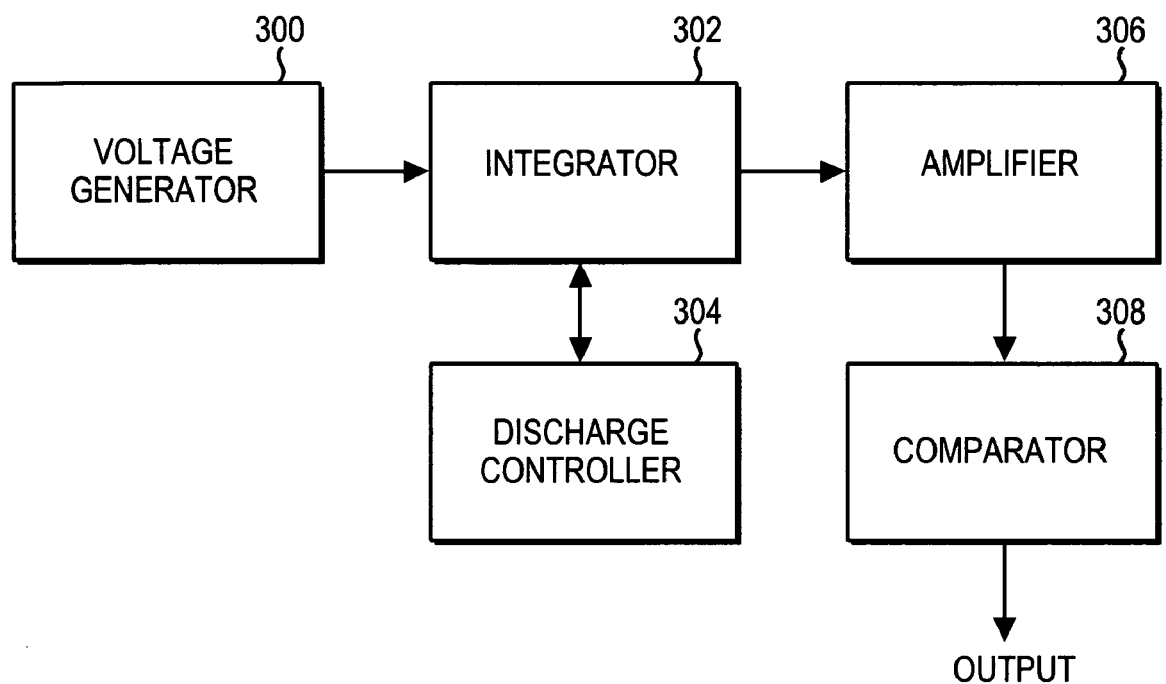
FIG. 1 is a block diagram showing the general operation of a circuit consistent with the arc detector of the instant invention.

The operation of the circuit module is described with reference to FIG. 1. In voltage generator 300, a voltage is generated proportional to a voltage across the load 200. A voltage generated by voltage generator 300 is output to integrator 302. The integrator 302 integrates the voltage output from voltage generator 300, i.e., generates a signal consistent with total voltage output from the voltage generator 300 over a given time interval. Discharge controller 304 controls current flow through the integrator 302, thereby ensuring current flows through the integrator in only one direction. Amplifier 306 amplifies the signal output from the integrator 302, and outputs this signal to comparator 308. Comparator 308 compares the amplified signal to that of a reference voltage, and outputs a signal indicating the presence of an arc.

Figure 2:
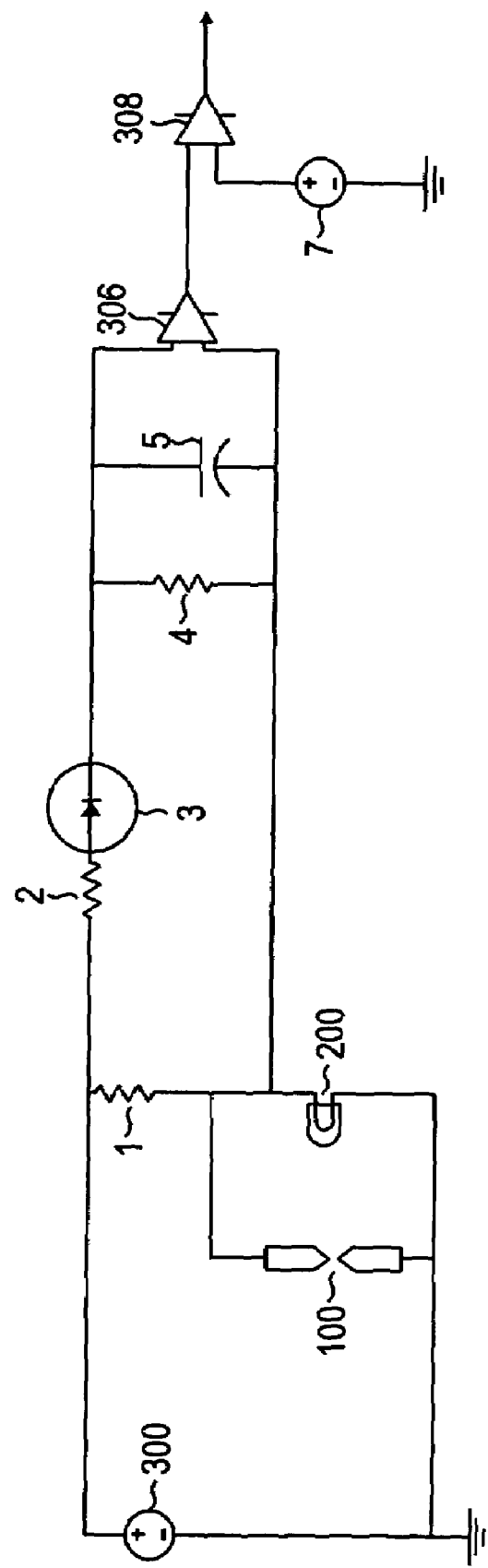
FIG. 2 is a schematic illustrating an exemplary arc detection circuit consistent with the present invention.

An exemplary circuit consistent with the block diagram of the arc detector of the instant invention will be described with reference to FIG. 1 and FIG. 2. In the exemplary circuit, voltage generator 300 consists of a current sensing resistor 1. Current sensing resistor 1 has a voltage across it proportional to the current flowing through current sensing resistor 1. The scaling of current sensing resistor 1, i.e., its resistance, is chosen according so that a known voltage can be produced at a certain current. Current sensing resistor 1 may also be variable so that large quantities of circuits may be manufactured without redesigning components.

Current sensing resistor 1 is connected to a voltage source 300 and integrator 302. Integrator 302 consists of resistor 2, diode 3 and capacitor 5. The integrator operates as follows: A current through current sense resistor 1 causes a voltage to appear across current sense resistor 1, thereby causing capacitor 5 to charge as current passes through resistor 2 and diode 3. When enough charge builds up in the capacitor 5, the capacitor discharges. The integration time constant of the integrator, i.e. the charge time of the capacitor 5, effects the maximum allowable inrush current. In other words, the time constant is set so the capacitor 5 is not discharged when the aforementioned inrush current flows through current sensing resistor 1 to capacitor 5. The integration time constant can be adjusted by changing the resistance of resistor 2 and the capacitance of capacitor 5. Thus, the arc detection circuit is adaptable to many different types of applications.

The discharge controller 304 consists of resistor 4 operating in conjunction with diode 3. It is noted that diode 3 is used in the integrator 302 and the discharge controller 304, though other circuit arrangements could be contemplated that would employ separate elements in the integrator 302 and the discharge controller 304. Resistor 4 and diode 3 control the discharge of capacitor 5. Without diode 3, capacitor 5 would discharge back through resistor 2 at the same rate it charged. Diode 3 prevents the discharge through resistor 2, thereby allowing resistor 4 to discharge capacitor 5 at a slower rate. Thus, recurring, short duration, high current pulses and long duration, higher current pulses are effectively integrated.

When capacitor 5 discharges, a current is input into amplifier 306 and amplified. The amplified signal is then output to comparator 308. Comparator 308 receives a reference voltage 7, typically 2.5 volts, and outputs an arc signal when an arc is detected.

Figure 3:
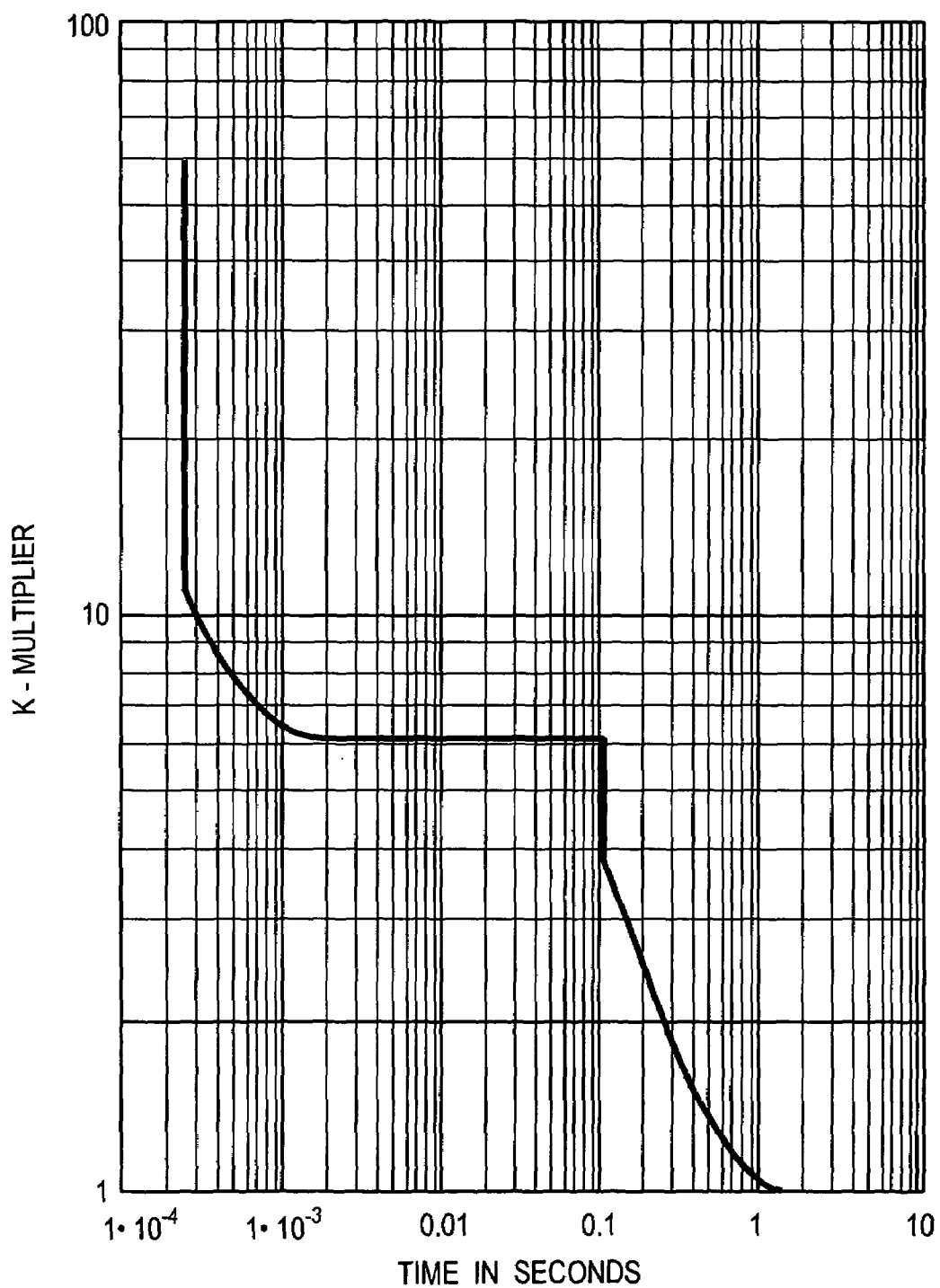
FIG. 3 is a graph showing a typical time versus current curve illustrating the normal peak current value.

The normal peak current of an arc is variable, but an exemplary time versus current curve used for determining the normal peak current of an arc and the reference voltage value (so that the circuit can be designed with the proper resistance and capacitance values) when designing the arc detection circuit consistent with the instant invention is shown in FIG. 3.

Arc Circuit Testing

Arc currents were generated in several ways for testing the arc detector circuit of the instant invention. One method developed was a guillotine, shown in FIG. 7b. The guillotine 500 was formed by using a weighted blade 502 that is hoisted to a fixed height and then allowed to drop onto a zip cord 508 carrying power and ground conductors. The blade drops onto the zip cord at the same angle and at the same velocity every time. It slices into and shorts together the 28 volt DC and ground for a short period of time before the springs 504 return the blade 502 to the non-shorting position. The duration of the arcing event is determined by the height of the blade 502's drop point, the wire insulation material, blade sharpness, and by the stiffness of the springs 504. The arc produced by the guillotine is a classic DC arc, and is different from a hard short only by the fact that it has a non-zero and dynamic impedance. The key to the repeatable nature of the guillotine test is in the fact that it is not hand operated.

Figure 7A:
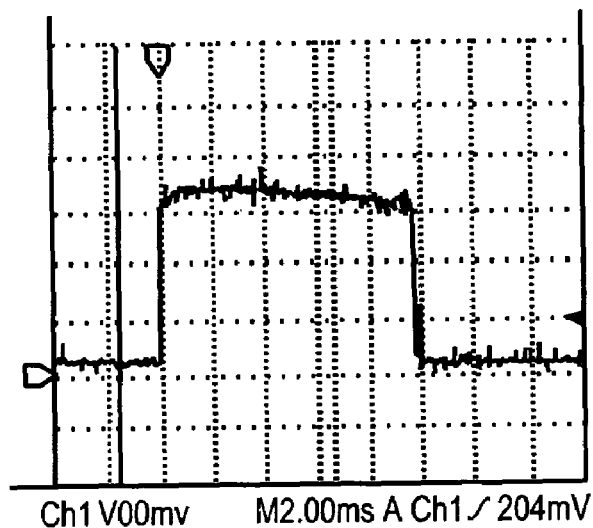
FIGS. 7a and 7b are a graph and apparatus, respectively, illustrating an arc producing device known as the guillotine generating a classic DC arc.
Figure 7B:
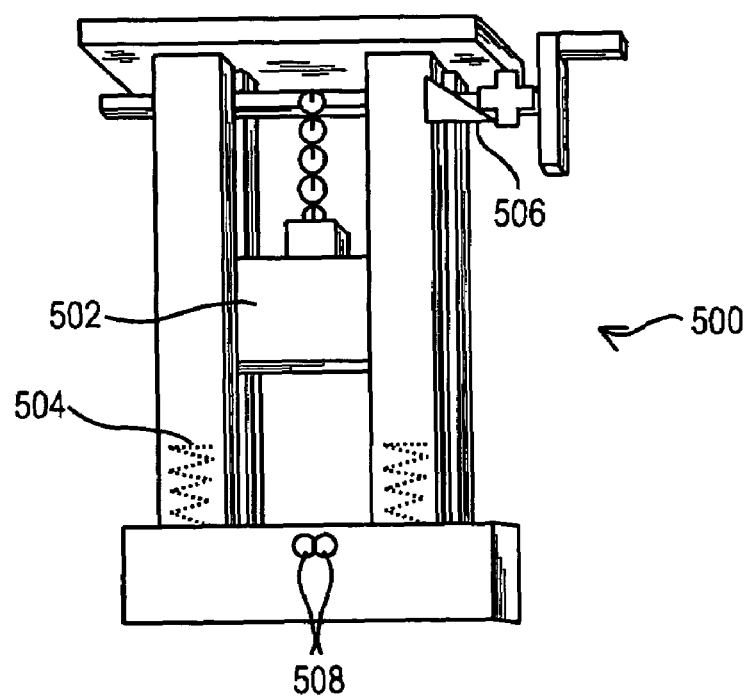
Figure 8A:
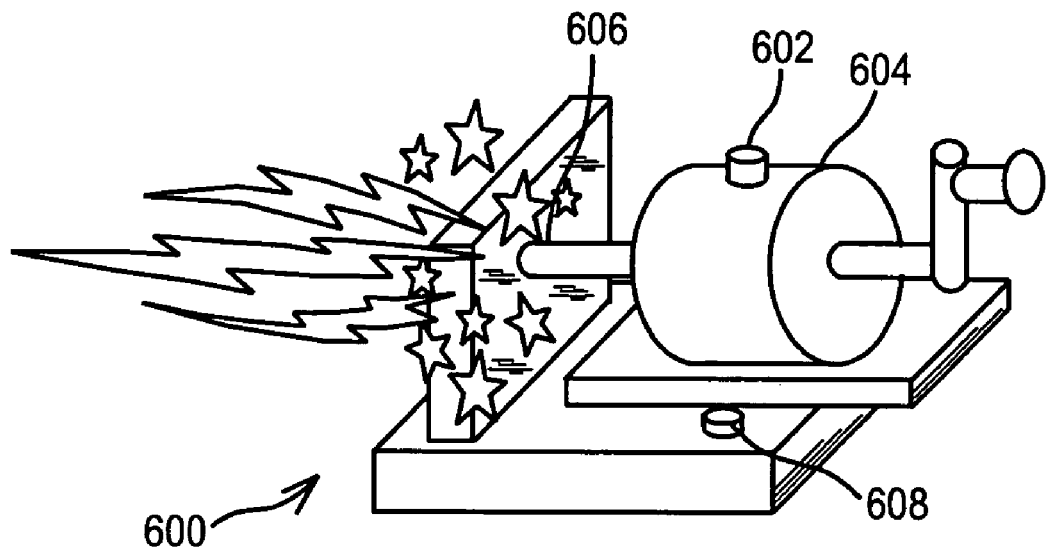
FIGS. 8a and 8b are a rotary spark gap device and a rotary spark gap current waveform, respectively.
Figure 8B:
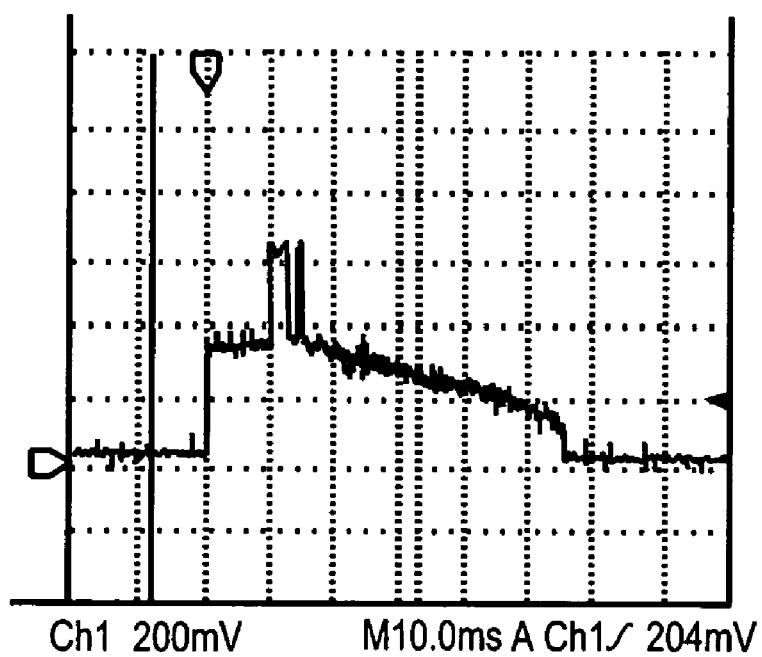
Figure 9:
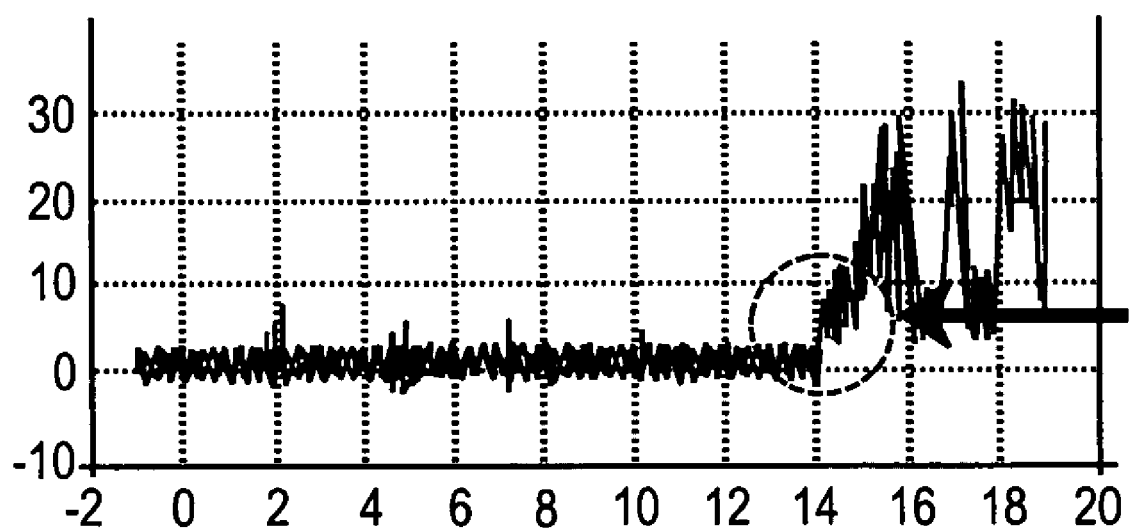
FIG. 9 is a graph showing the current detected through a load during an arcing event.
Figure 10:
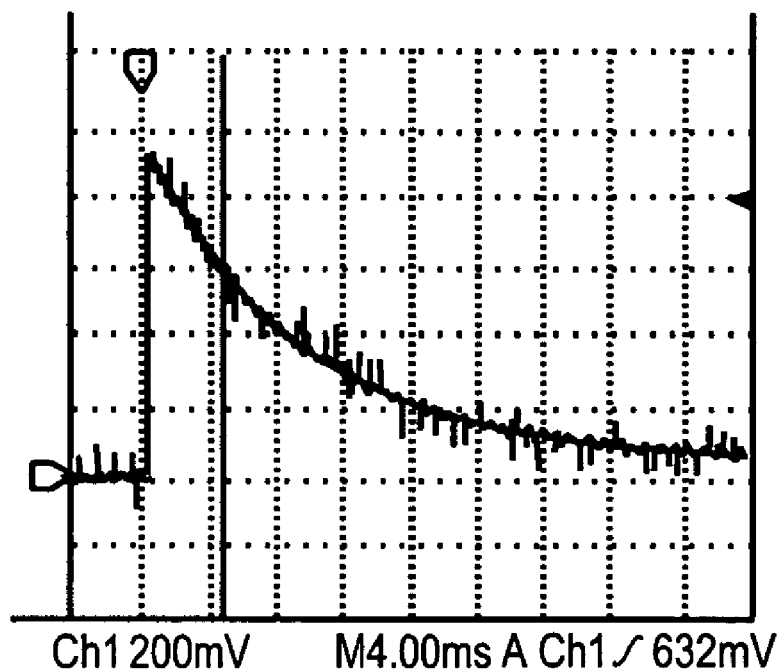
FIG. 10 is a graph showing the current characteristics of a capacitance inrush current.
Figure 11:
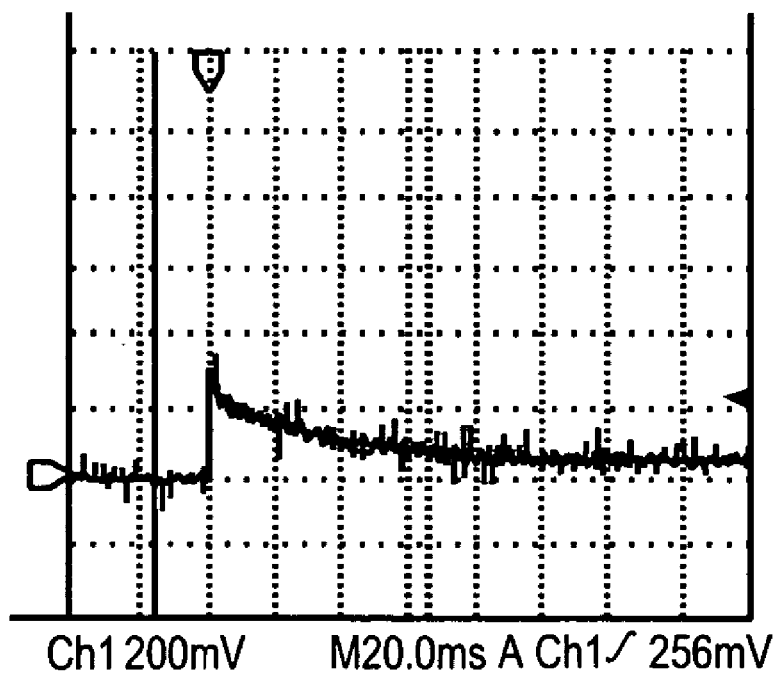
FIG. 11 is a graph showing the current characteristics of a lamp inrush current.

Another arc producing device developed was the Rotary Spark Gap device 600 described in FIG. 8a. The rotary spark gap device 600 creates a momentary arc across an operating load by brushing a wire 602 connected to a 28 volt DC load terminal 604 against the sides of a hold 606 in a ground metal contact 608. The rotary spark gap device 600 accurately models a chaffed wire vibrating against bare aircraft metal. A typical output waveform from this apparatus is shown in FIG. 7b. The rotary spark gap device simulates arcs that are caused by wires with faulty insulation contacting the bare aircraft metal.

Using these exemplary devices, the response of the arc detection circuit of the instant invention to various transient events was determined.

Figure 4:
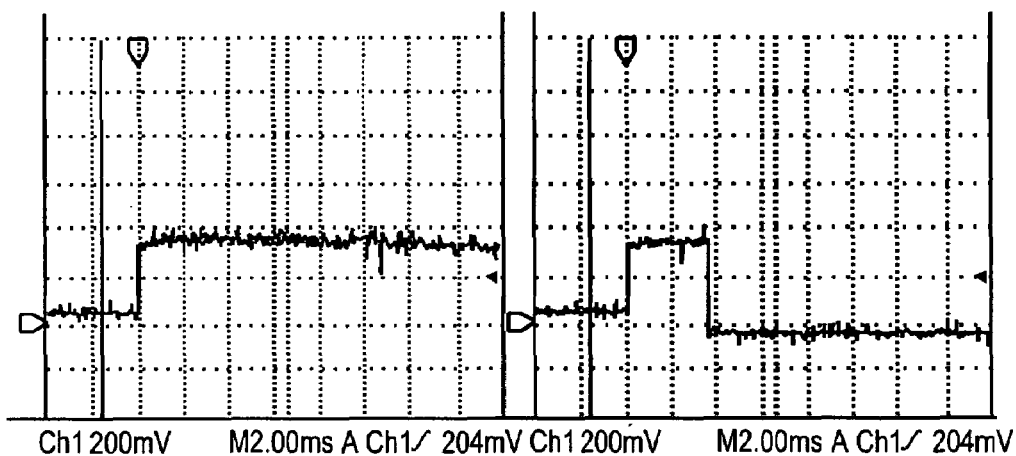
FIG. 4a and FIG. 4b are graphs illustrating the operation of a circuit breaker versus the arc detection circuit of the instant invention, respectively.

The operation of the arc detector of the instant invention versus the operation of the circuit breaker is shown in FIG. 4a and FIG. 4b. In FIG. 4a, a circuit breaker receiving an arc does not interrupt an arc event, even after 55 milliseconds. However, in FIG. 4b, arc detector of the instant invention detects and interrupts the current within four milliseconds.

Figure 5:
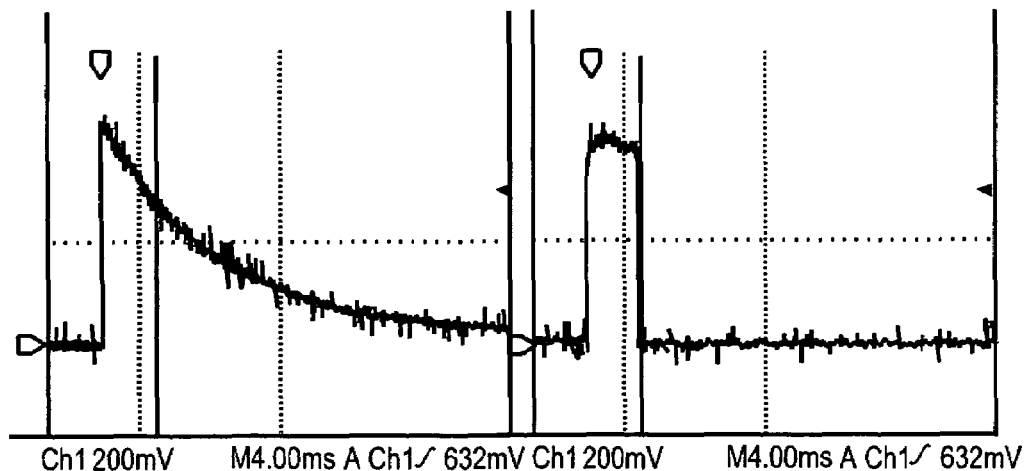
FIG. 5a and FIG. 5b are graphs illustrating the operation of the arc detection circuit of the instant invention when the circuit receives a capacitance inrush current and the operation of the arc detection circuit of the instant invention when in the arc detection circuit receives an arc current, respectively.

FIG. 5a and FIG. 5b describe the operation of the arc circuit of the instant invention when receiving an inrush current versus when receiving an arc current. It is noted that the arc detector of the instant invention ignores the inrush current because, by setting the capacitance of capacitor 5 and the resistance of resistor 2, the arc detector has a maximum inrush current, e.g., 45 amps. It is noted that the arc detector detects a longer duration arc event and trips after only a 4 or 5 millisecond delay period.

Figure 6:
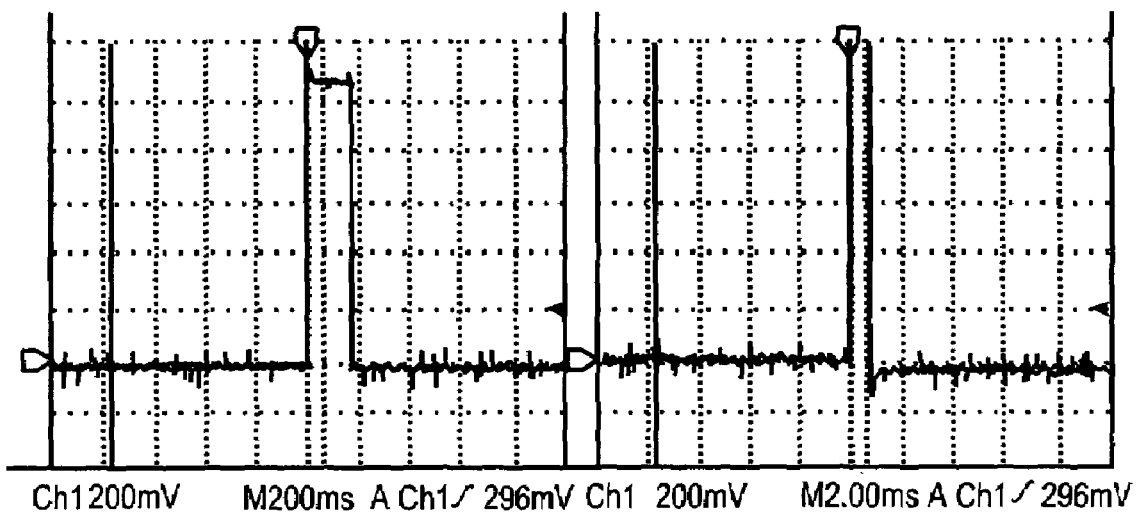
FIGS. 6a and 6b illustrate the operation of a circuit breaker and the arc detection circuit of the instant invention, respectively, when both circuits relieve a dead short from a power source.

The arc detector of the Applicant's invention can also be used to interrupt a dead short from a power source. In FIG. 6a, the current characteristics of a circuit employing a conventional circuit breaker is depicted. It is noted that the circuit breaker circuit takes over 200 milliseconds to break the current. In FIG. 6b, the arc detector circuit of the instant invention is depicted. The arc detector circuit breaks the current after only 200 microseconds, i.e., 3 orders of magnitude improvement over the circuit breaker circuit.

One skilled in the art will recognize that various changes could be made to the foregoing without departing from the spirit and scope of the invention.

What is claimed:

1. A DC arc detector comprising:
   a voltage generator for detecting a voltage;
   an integrator for integrating said voltage with respect to time and generating an output signal corresponding to said integration;
   a discharge controller for controlling said output signal of said integrator;
   an amplifier for amplifying said output signal from said integrator and outputting an amplified signal; and a comparator for comparing said amplified output signal to a reference voltage and generating a detection signal based on said comparison.

2. The arc detector described in claim 1 wherein said voltage generator includes a current sensing resistor.

3. The arc detector of claim 2 wherein said integrator comprises a second resistor, a diode and a capacitor.

4. The arc detector of claim 3 wherein said discharge controller comprises a third resistor and said diode.

5. The arc detector of claim 1 wherein said integrator comprises a resistor, a capacitor, and a diode.

6. The arc detector of claim 5 wherein said discharge controller comprises said diode and a second resistor.

7. A method for detecting a DC arc comprising the steps of:

generating a voltage;

integrating said voltage with respect to time and generating a first signal;

amplifying said first signal and generating a second signal; and comparing said second signal to a reference voltage to generate a arc detection signal.

* * * * *